Patented Oct. 21, 1930

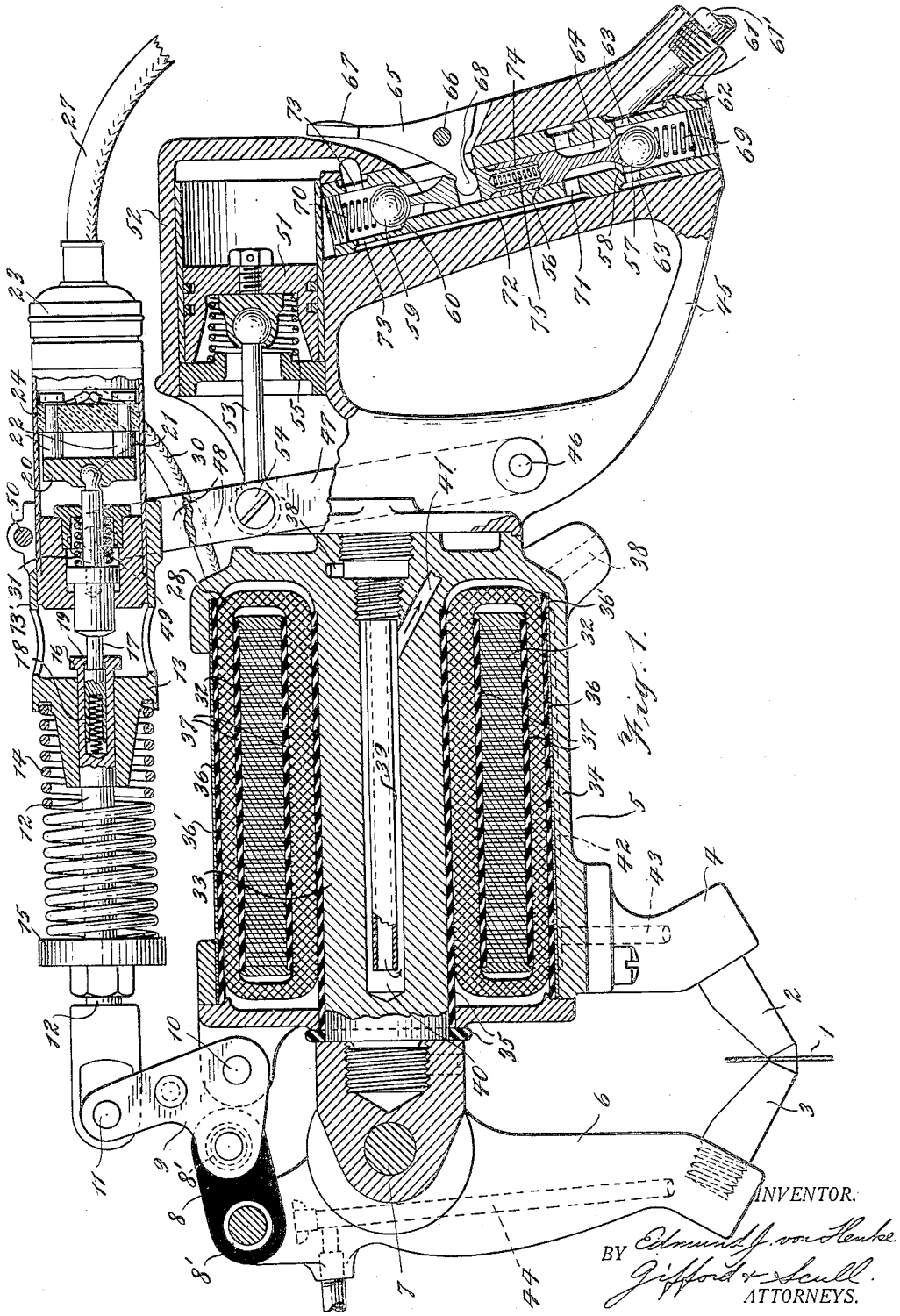

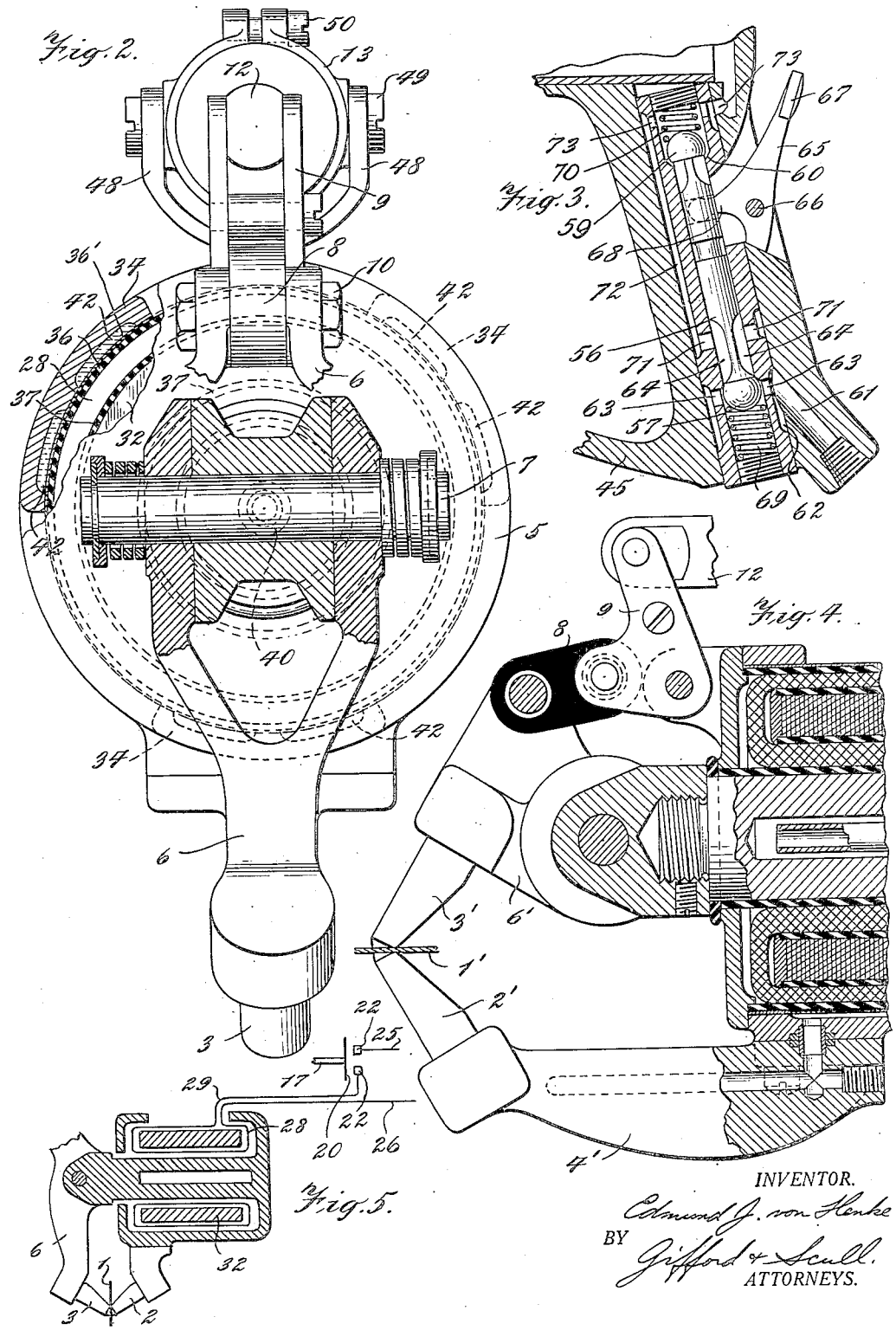

1,779,365

UNITED STATES PATENT OFFICE

EDMUND J. VON HENKE, OF CHICAGO, ILLINOIS, ASSIGNOR TO AMERICAN ELECTRIC FUSION CORPORATION, OF CHICAGO, ILLINOIS, A CORPORATION OF ILLINOIS

PORTABLE WELDING MACHINE

Application filed October 8, 1927. Serial No. 224,820.

This invention relates to a novel and improved welding machine and has for its object to provide such a machine which is portable and which may be carried and operated by hand.

The invention will be best understood from the following description and the accompanying drawings, in which I have shown selected embodiments of the invention.

Referring to the drawings:—

Fig. 1 is a longitudinal sectional view through one form of the invention, certain parts being shown in elevation.

Fig. 2 is an end view of the structure shown in Fig. 1, parts being broken away and other parts being shown in section.

Fig. 3 is a detailed view of a portion of the handle shown in Fig. 1, with the parts in different positions from the ones occupied in Fig. 1.

Fig. 4 is a fragmentary view corresponding to Fig. 1, but showing a different arrangement of the electrodes with respect to the transformer.

Fig. 5 is a diagrammatic view showing the electrical connections.

Referring now to Figs. 1, 2, 3 and 5, the numeral 1 designates the work which is to be welded, the welding machine comprising a pair of electrodes 2 and 3, adapted to be disposed upon opposite sides of the work and movable with respect to each other, so as to permit the work to be placed and clamped therebetween.

In the illustrated embodiment, the electrode 2 is shown as being supported on a bracket 4 which is rigidly held in place on the transformer, which is designated generally as 5. The electrode 3 is secured to an arm 6 which is pivoted at 7 upon the transformer. The arm 6 is operated to bring it into and out of operative position, with respect to the work and to the other electrode, by means of a link 8 which is pivoted to the arm and also to one leg of a bell-crank lever 9 which is pivoted at 10, upon the transformer. The link 8 is of insulating material and its pivots are preferably provided with bronze bushings 8'. The other leg of the bell-crank lever 9 is pivoted at 11 to a rod 12, upon which is slidably mounted a block 13. A spring 14 under compression is disposed between the block 13 and a fixed member such as a washer 15 on the rod and yieldingly urges the block to the right as viewed in Fig. 1, the movement being limited by means of a shoulder 16 on the end of the rod.

Slidably mounted in a bore in the rod 12 is a plunger 17, this plunger being urged to the right in Fig. 1 by the spring 18 engaging one end thereof, and limited in this movement by engagement of a shoulder on the plunger with a corresponding shoulder 19 surrounding the bore in the rod, as plainly shown in Fig. 1. The plunger is provided at its other end with a head 20 in the form of a disk of conducting material movably secured to the plunger by the ball and socket connection 21. The head 20 is adapted to bridge two relatively fixed contacts 22, which are disposed in the shell 23, which is secured to the block 13. The contacts are insulated from each other, as by being mounted upon a member 24 of insulating material fixed in position in the shell.

Referring now particularly to Figs. 1 and 5, there are shown therein a pair of conductors 25 and 26, which may be brought into the shell 23 by means of flexible connection 27 of the usual construction. This flexible connection is adapted to carry the conductors 25 and 26 to a suitable source of electric energy, and more particularly to a source of alternating current. The conductors 25 and 26 are connected to the contacts 22 and the conductors 29 lead from the contacts to the primary winding 28 of the transformer 5, these conductors between the shell 23 and the transformer, being received in a flexible connection 30 indicated in Fig. 1.

By the arrangement described above, movement of the plunger to the right, will cause the head 20 to engage with and to bridge the contacts 22, thus permitting current to flow through the primary of the transformer, the plunger normally being held in position to maintain the circuit open, by means of a spring 31. The core of the transformer is indicated at 32, and the secondary is formed by a pot having a center stud 33 and an outer wall. This outer wall, as shown in Fig. 2, is formed of a plurality of segments 34, each of which is electrically connected to the stud at one end of the stud. Suitable insulation 35 is disposed between the stud and the primary and likewise suitable insulation 36 is disposed between the primary and the segments 34. The usual insulation 37 is also disposed between the primary and the core. It will be seen that the insulation 35 separates the stud from the lower ends of the segments 34, and that the alternating current induced in the secondary may pass through the bracket 4 and arm 6 to the electrodes 2 and 3 respectively, and thus through the work held between the electrodes.

In order to make possible the building of a welding machine of such weight that it may be easily carried and operated by hand, I prefer to use a high frequency alternating current, for example, a frequency of 180 cycles per second. By using this frequency, it is possible to use a transformer having a smaller core and also smaller cross-sectional area for the conducting parts. In order to prevent over-heating of the various parts of the transformer and the machine, I provide a water circulating system by which the water may enter the secondary at 38 and pass through a pipe 38' to the pipe 39 disposed in a bore 40 in the center stud 33. The water may then pass through the bores 40 and 41 to conduits 42 in the segments 34. A thin sheet of copper 36' is disposed exteriorly of the insulation 36, to form the inner walls of the conduits. The water may be discharged through any suitable outlet, not shown. One of the conduits 42 may be connected to a pipe 43 running into the bracket 4, to aid in cooling the electrode 2, and a separate pipe 44 may be employed for supplying water to cool the arm 6 and electrode 3.

The block 13 may be operated to actuate the arm 6 and thereby bring the electrode 3 into operative relation with respect to the work and the other electrode 2, and to then effect the closing of the circuit to the primary of the transformer, by means conveniently located with respect to a handle by which the entire machine may be carried or manipulated. In the embodiment shown, the handle is indicated at 45, and it may be secured to the transformer by any suitable means. Pivoted on the handle as at 46, is an operating lever 47 which is bifurcated at one end to form two arms 48 as shown in Fig. 2. These arms embrace the sleeve 13' integral with the block 13, and are pivoted thereto as at 49. The sleeve may be secured to the shell 23, by means of a clamping bolt 50.

The operating lever 47 is actuated by means of a piston 51 disposed in a cylinder 52 which is formed as part of the handle 45. The piston is connected to the lever 47 by the piston rod 53, which is pivoted to the lever at 54 and it will be noted that the piston is normally urged to the right by means of the spring 55.

The piston may be in turn actuated by a suitable fluid such as compressed air, and this fluid is controlled by a valve which is preferably located in the handle and operated by means within convenient reach of the operator, who, during the welding operation, will be holding the machine by the handle. In the illustrated embodiment, I have shown the valve as comprising a sliding stem 56, having at one end thereof, a head 57 adapted to cooperate with a valve seat 58 and also having at the other end, a head 59, adapted to cooperate with a valve seat 60. Fluid is admitted to the valve by means of an inlet 61, which may be connected to a fitting 61' of a flexible hose, and it will be seen that this fluid, which I shall hereafter refer to as air, will enter an annular chamber 62 which has a plurality of ports 63 communicating with an interior chamber 64. The air ordinarily can not pass to the chamber 64 because of the contact of the head 57 with the seat 58, the inoperative position being shown in Fig. 3.

The valve stem may be conveniently operated by means of a thumb piece 65, pivoted to the handle at 66, and having a button 67 for engagement by the thumb or hand of the operator. The thumb piece 65 also has a depending arm 68 which is received within a slot in the stem, whereby the depression of the thumb piece will cause the stem to move from the position shown in Fig. 3 to the position shown in Fig. 1, and unseat the head 57 from the valve seat 58. The normal inoperative position of the stem is shown in Fig. 3, the spring 69 urging the valve stem to that position against the action of a weaker spring 70.

When the valve has been operated to bring it to the position shown in Fig. 1, it will be seen that the air may then pass into the chamber 64, thence through the ports 71 to a chamber 72, and thence through ports 73 to the cylinder 52. It will also be seen that the head 59 will contact with the seat 60 and will be held in yielding engagement therewith, by means of the spring 70, a limited amount of relative movement between the heads 57 and 59 being permitted by the fact that these two heads are mounted on separate parts of the stem which are slidable in respect to each other, as shown at 74 in Fig. 1. A suitable spring 75 normally holds both heads against their respective springs 69 and 70.

Operation of the valve as just described, will actuate the piston, compressing the spring 55, and the block 13 and shell 23 will be moved to the left in Fig. 1. This movement will be transmitted through the spring 14 to the washer 15 and the rod 12, and will thus cause actuation of the lever 6 connected to the electrode 3. As the electrode 3 comes into contact with the work 1, further movement of the rod 12 becomes impossible, and then the block 13 and shell 23 continue their movement, this movement now being relatively to the rod 12 which is now held stationary. This movement will compress the spring 14 and will also cause the head 20 to come into engagement with the contacts 22 and close the circuit to the primary of the transformer. The parts will now occupy the positions shown in Fig. 1.

Similarly, when the pressure on the thumb piece 65 is released, the parts of the valve will return to the position shown in Fig. 3, because of the action of the spring 69. The air will exhaust from the cylinder, passing between the head 59 and the seat 60, and the spring 55 will move the piston 51 to the right in Fig. 1, it being remembered that this spring was compressed during the actuation of the piston. The result will be that as soon as the pressure on the piston is released, the springs 14 and 55 will move the block 13 and shell 23 to the right with respect to the rod 12 and break the circuit to the primary by moving the contacts 22 out of engagement with the head 20. As the block 13 engages the shoulder 16, movement of the rod 12 to the right will be caused, thus moving the electrode 3 out of engagement with the work 1.

From the above, it will be seen that the electrodes are first brought into operative position with respect to the work and then the circuit is closed. After the welding operation has taken place, the circuit is first broken and then the electrodes are moved away from each other, thus following the proper sequence of steps.

The springs 18 and 31 oppose one another in their action, the spring 18 being stiffer than the spring 31. Thus, when the block 13 and shell 23 are moved towards the left in Fig. 1, this movement is not transmitted to the plunger 17. The spring 31 will be compressed, but the superior strength of the spring 18 will hold the plunger substantially stationary, until the head 20 comes into engagement with the contacts 22. Further movement of the block 13 and the shell 23 will exert a pressure upon the plunger, which is absorbed by the spring 18, which thus acts as a safety spring. The spring 31 yieldingly holds the plunger against the spring 18 and prevents sticking of the head 20 against the contacts 22, when the block 13 and shell 23 are moved towards the right in Fig. 1.

In Fig. 4, I have shown a modification of my invention in which the electrodes are disposed in different positions from those shown in Fig. 1. This arrangement may be more desirable for work arranged in a different position from the work shown in Fig. 1. In Fig. 4, the work 1' is shown as extending substantially parallel to the axis of the transformer, instead of transversely thereto, as in Fig. 1. The rod 12, lever 9 and link 8 are identical with those shown in Fig. 1, but the arm 6' is shorter and is so designed that the electrode 3' has its face extending substantially vertically. Similarly, the bracket 4' is arranged so that it supports the electrode 2' with its face in position to cooperate with the face of the electrode 3'. In other respects, this form is substantially the same as that shown in Fig. 1.

From the above, it will be apparent that I have achieved a portable welding machine which may be transported from place to place and which may be easily held by hand when being operated. When so held, the mere pressure of the thumb of the operator's hand is all that is necessary to control the operation. I am of course aware that welding machines have been hitherto constructed which are movable on supports of some kind or another, and I use the word "portable" to mean "unsupported", except by the hands of the operator or any other temporary support which may be improvised when the machine is in use.

The machine has a wide variety of uses, but is particularly adapted for use as a spot welder. Heretofore, efforts have been made to build a commercially successful spot welder, but these efforts have failed on account of the heavy weight of the machine when designed for commercial frequencies of electric current. In order to spot weld, at least 4,000 to 5,000 amperes of current are necessary in the secondary circuit of the transformer. In order to force that current through the secondary circuit, between 1.25 to 1.50 volts would be necessary across the secondary, and inasmuch as the secondary is invariably made with one turn, the core must contain between 4 and 6 square inches of active material in its cross-sectional area, in order to make the path for the heavy current as short as possible. This would mean that such core would weigh about 10 or 12 lbs., and the primary winding on such a large core would weigh about 6 lbs. more, while the secondary and the electrodes would weigh another 10 or 12 lbs. as these parts would have to be of fairly heavy copper construction in order to carry the 4,000 or 5,000 amperes. Thus, the minimum weight of a portable welder, constructed for standard commercial frequencies, say those not exceeding 60 cycles, would be between 30 and 40 lbs. which is obviously too much weight for a commercially successful portable tool. In order to reduce the weight, I have used a frequency preferably of 180 cycles in combination with the transformer and other parts above described. By this means, I have achieved a self contained spot welder of a weight of approximately 19 lbs. this welder being constructed as above described and shown.

While I have shown selected embodiments of my invention, I am aware that various changes in size, proportion and details may be made, without departing from the spirit of my invention, and I do not intend to limit myself except by the appended claims.

I claim:—

1. A portable welding machine comprising electrodes, a transformer having its secondary electrically connected to said electrodes, a handle secured to said transformer, whereby the machine may be manually held in operative position with respect to the work, a flexible connection adapted to connect the transformer to a source of electrical energy, a switch between said connection and said transformer, and means on said handle to operate said switch, said means comprising a piston, a source of fluid pressure connected to said piston, a valve disposed on said handle and adapted to control the passage of said fluid to said piston, and means on said handle to operate said valve.

2. A portable welding machine comprising a transformer, a pair of electrodes connected to the secondary of said transformer, a flexible connection between the primary of said transformer and a source of electrical energy, a switch to connect said transformer to said source, a handle secured to said transformer, a piston operatively mounted on said handle and connected to said switch, means to connect said handle to a source of fluid under pressure to operate said piston, a valve on said handle to control said fluid, and a thumb piece on said handle to operate said valve.

3. A portable welding machine comprising a transformer having a center stud and an outer wall electrically connected to one end of the stud and insulated from the other end thereof, said stud and wall forming the secondary of the transformer, a primary disposed between said stud and wall, an electrode electrically connected to said wall, a second electrode electrically connected to said stud, and a handle secured to said transformer.

4. A portable welding machine comprising a transformer having a center stud and an outer wall electrically connected to one end of the stud and insulated from the other end thereof, said stud and wall forming the secondary of the transformer, a primary disposed between said stud and wall, an electrode electrically connected to said wall, a second electrode electrically connected to said stud, a handle secured to said transformer, and means on said handle to control the operation of said transformer.

5. A portable welding machine comprising a transformer having a handle secured to the secondary thereof, a flexible connection from the primary of said transformer to a source of electrical energy, two electrodes mounted on said secondary and electrically connected thereto and one being movable with respect to the other, means to move said movable electrode towards the other, and means adjacent the handle and adapted to operate said electrode-moving means.

6. A portable welding machine comprising a transformer having a handle secured to the secondary thereof, a flexible connection from the primary of said transformer to a source of electrical energy, two electrodes mounted on said secondary and electrically connected thereto and one being movable with respect to the other, a switch between said connection and transformer, and means to move said movable electrode towards the other and to close said switch, and means adjacent the handle to operate said electrode-moving means.

7. A portable welding machine comprising a transformer having a handle secured to the secondary thereof, a flexible connection from the primary of said transformer to a source of electrical energy, two electrodes mounted on said secondary and electrically connected thereto and one being movable with respect to the other, a switch between said connection and transformer, means to move said movable electrode towards the other and to close said switch, and means to move said movable electrode away from the other and to open said switch, and means adjacent the handle to operate said electrode-moving means.

8. A portable welding machine comprising a transformer having a primary, a secondary surrounding said primary and having two portions separated by insulation, an electrode mounted on and electrically connected to each of said portions of the secondary and movable one towards and away from the other, a handle secured to said secondary, and means mounted on the transformer and adapted to cause relative movement between said electrodes.

9. A portable welding machine comprising a transformer having a primary, a secondary surrounding said primary and having two portions separated by insulation, an electrode mounted on and electrically connected to each of said portions of the secondary and movable one towards and away from the other, a handle secured to said secondary, means mounted on the transformer and adapted to cause relative movement between said electrodes, and means adjacent said handle to operate said electrode-moving means.

10. A portable welding machine comprising a transformer having a primary, a secondary surrounding said primary and having two portions separated by insulation, an electrode mounted on and electrically connected to each of said portions of the secondary, one of said electrodes being pivoted to the secondary, a member movably mounted on the secondary and adapted to operate said pivoted electrode, a flexible connection from said primary to a source of electrical energy, a normally open switch between said connection and the primary and disposed on said member, and means to move said member to operate said electrode and switch.

11. A portable welding machine comprising a transformer having a primary, a secondary surrounding said primary and having two portions separated by insulation, an electrode mounted on and electrically connected to each of said portions of the secondary, one of said electrodes being pivoted to the secondary, a member movably mounted on the secondary and adapted to operate said pivoted electrode, a flexible connection from said primary to a source of electrical energy, a normally open switch between said connection and the primary and disposed on said member, means to move said member to operate said electrode and switch, said means including a piston movable in a cylinder, a flexible connection from said cylinder to a source of fluid pressure, and a valve between the cylinder and connection to control said pressure.

EDMUND J. von HENKE.